United States Patent [19]
Paoli et al.

[11] Patent Number: 5,461,412
[45] Date of Patent: Oct. 24, 1995

[54] METHOD AND APPARATUS FOR ACTIVELY CORRECTING CURVATURE IN THE SCAN OF AN OPTICAL OUTPUT DEVICE

[75] Inventors: Thomas L. Paoli, Los Altos, Calif.; James J. Appel, Brighton, N.Y.

[73] Assignee: Xerox Corporation, Stamford, Conn.

[21] Appl. No.: 96,357

[22] Filed: Jul. 23, 1993

[51] Int. Cl.$^6$ ..................................................... B41J 2/43
[52] U.S. Cl. .......................................... 347/243; 347/236
[58] Field of Search ................................. 347/236, 246, 347/241, 243, 256, 259, 260

[56] References Cited

U.S. PATENT DOCUMENTS

| | | |
|---|---|---|
| 4,040,096 | 8/1977 | Starkweather . |
| 4,250,465 | 2/1981 | Leib . |
| 4,404,571 | 9/1983 | Kitamura . |
| 4,600,837 | 7/1986 | DiStefano et al. . |
| 4,638,334 | 1/1987 | Burnham et al. . |
| 4,651,169 | 3/1987 | Muka . |

(List continued on next page.)

FOREIGN PATENT DOCUMENTS

| | | |
|---|---|---|
| 0388981 | 9/1990 | European Pat. Off. . |
| 2548796 | 1/1985 | France . |
| 61-134728 | 6/1986 | Japan . |
| WO91/08504 | 6/1991 | WIPO . |

OTHER PUBLICATIONS

Bestenreiner, F., U. Greis, J. Helmberger, and K. Stadler, "Visibility and Correction of Periodic Interference Structures in Line-by-Line Recorded Images", Journal of Applied Photographic Engineering, 2:2, Spring 1976, pp. 86–92.

Filinski, I. and T. Skettrup, "Fast Dispersive Beam Deflectors and Modulators", IEEE Journal of Quantum Electronics, QE-18;7, Jul. 1982, pp. 1059–1062.

Urbach, John C., Tibor S. Fisli, and Gary K. Starkweather, "Laser Scanning for Electronic Printing", Proceedings of the IEEE, 70:6, Jun. 1982, pp. 597–618.

Sprague, Robert A., John C. Urbach, and Tibor S. Fisli, "Advances in Laser and E–O Printing Technology", Laser Focus/Electro–Optics, Oct. 1983, pp. 101–109.

Born, Max, and Emil Wolf et al., Principles of Optics, 5th Ed., 1975, Pergamon Press, New York, pp. 177–180; and 405–407.

Kasminow, Ivan P., "Measurements of the Electrooptic Effect in CdS, Zn Te, and GaAs at 10.6 Microns", IEEE Journal of Quantum Electronics, QE–4:1, Jan. 1968, pp. 23–26.

Houghton, A. J. N., P. M. Rodgers and D. A. Andrews, "High–Performance GaAs–GaAlAs Phase Modulators for PSK Optical Fibre Systems", Electronics Letters, May 24, 1984, 20:11, pp. 479–481.

Simes, R. J., R. H. Yan, R. S. Geels, L. A. Coldren, J. H. English, A. C. Gossard, and D. G. Lishan, "Electrically Tunable Fabry–Perot Mirror Using Multiple Quantum Well Index Modulation", Applied Physics Letters, 53:8, Aug. 22, 1988, pp. 637–639.

D. G. Lishan, "Electrically Tunable Fabry–Perot Mirror Using Multiple Quantum Well Index Modulation", Applied Physics Letters, 53:8, Aug. 22, 1988, pp. 637–639.

Casey, H. C. Jr., D. D. Sell, and M. B. Panish, "Refractive Index of $Al_xGa_{1-x}$ As Between 1.2 and 1.8 eV", Applied Physics Letters, 24;2, Jan. 15, 1974, pp. 63–65.

Casey, H. C. Jr. and M. B. Panish, Heterostructure Lasers: Part A, Academic Press, New York, 1978, p. 31.

*Primary Examiner*—Mark J. Reinhart
*Attorney, Agent, or Firm*—Oliff & Berridge

[57] ABSTRACT

In an optical output device in which a beam of light is generated, focused to a spot, and scanned across an image plane to form a scan line, scan line curvature caused by offset between at least one light source and an optical axis of the device is corrected. The invention may be embodied in an apparatus that includes a light source capable of emitting the beam of light at a selected one of at least two selectable wavelengths and a deflecting element such as a prism that refracts the beam of light by an amount that depends on the wavelength of the beam.

28 Claims, 7 Drawing Sheets

U.S. PATENT DOCUMENTS

| | | |
|---|---|---|
| 4,651,170 | 3/1987 | Chandler et al. . |
| 4,829,175 | 5/1989 | Goto et al. . |
| 4,962,057 | 10/1990 | Epler et al. . |
| 4,977,411 | 12/1990 | Pepe . |
| 5,204,523 | 4/1993 | Appel et al. . |
| 5,208,456 | 5/1993 | Appel et al. . |
| 5,212,381 | 5/1993 | Appel et al. . |

METHOD AND APPARATUS FOR ACTIVELY CORRECTING CURVATURE IN THE SCAN OF AN OPTICAL OUTPUT DEVICE

BACKGROUND OF THE INVENTION

1. Field of the Invention

The present invention relates generally to the field of optical output devices, and more specifically to a method and apparatus for eliminating curvature in the scan of an optical output device.

2. Related Art

Although applicable to a wide variety of optical output devices, the present invention finds particular utility in a Raster Output Scanning (ROS) apparatus. ROS has become the predominant method for imparting modulated light information onto the photoreceptor in printing apparatus used, for example, in digital printing, and has found some application in other image forming operations such as writing to a display, to photographic film, etc. Consider, for illustration purposes, what is perhaps the most common application of ROS, digital printing. As is known, the scanning aspect thereof is conventionally carried out by a moving reflective surface, which is typically a multifaceted polygon with one or more facets being mirrors. The polygon is rotated about an axis while an intensity-modulated light beam, typically laser light, is brought to bear on the rotating polygon at a predetermined angle. The light beam is reflected by a facet and thereafter focussed to a "spot" on a photosensitive recording medium. The rotation of the polygon causes the spot to scan linearly across the photosensitive medium in a fast scan (i.e., line scan) direction. Meanwhile, the photosensitive medium is advanced relatively more slowly than the rate of the fast scan in a slow scan direction which is orthogonal to the fast scan direction. In this way, the beam scans the recording medium in a raster scanning pattern. (Although, for the purposes of example, this discussion is in terms of ROE; apparatus, as will become apparent from the following discussion, there exist many other scanning and non-scanning system embodiments of the present invention. However, as a convention, the word "scan" when referring to fast and slow scan directions will be used with the understanding that actual scanning of the spot is not absolutely required.) Data in each of the fast and slow scan directions is generally sampled. The sampling rate of the slow scan direction data equates to 300 lines per inch or more in many printing apparatus. The light beam is intensity-modulated in accordance with a serial data stream at a rate such that individual picture elements ("pixels") of the image represented by the data stream are exposed on the photosensitive medium to form a latent image, which is then transferred to an appropriate image receiving medium such as sheet paper.

An important characteristic of the multiple scan lines that comprise the latent image is the relative spacing between different pairs of lines at each position in the fast scan direction. High quality printing requires scan lines that are accurately positioned relative to each other in the slow scan direction and accurately linear over the entire scan width. U.S. Pat. Nos. 5,208,456, 5,204,523, and 5,212,381, and U.S. Patent application Ser. No. 07/747,039, the disclosures of which are incorporated herein by reference, disclose methods and apparatus for accurately positioning the scan lines at the beginning of each scan but do not teach maintaining linearity over the entire scan width.

Figure 1:
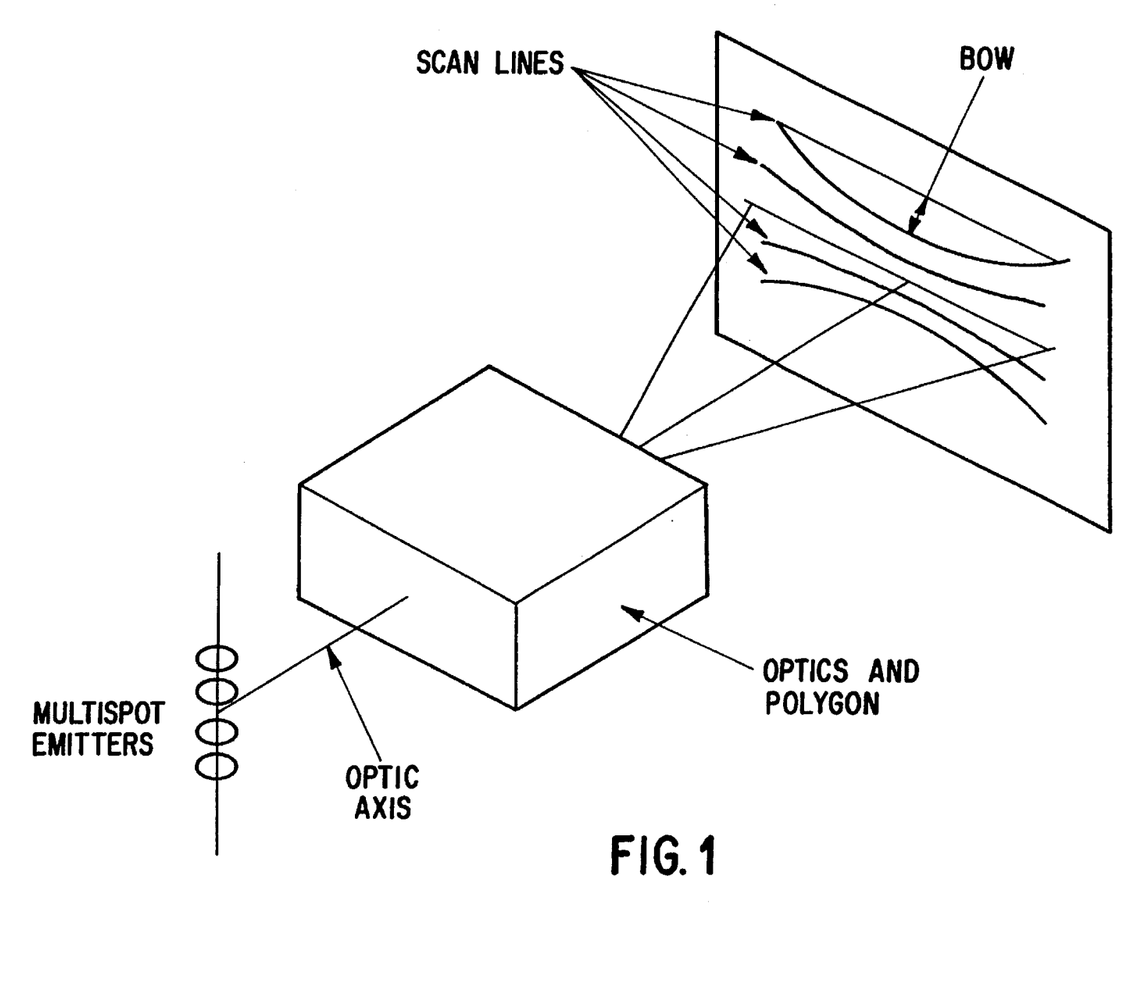
FIG. 1 illustrates the curvature or bow which occurs in the scanned output as a result of the nonaxial position of optical sources in a raster output scanning system.

Scan line linearity is a significant problem in scanners employing multiple beams, such as disclosed in U.S. Pat. No. 4,404,571, because curvature, also called "bow", occurs in the output scan line when the optical source is displaced from the optical axis of the lens system. This bow can be eliminated in the single laser ROS by accurately aligining the optical source on the optical axis. Because it is impossible to align more than one source on the optical axis, however, with a multiple beam source it is impossible to eliminate bow simultaneously in all scanned lines. Furthermore, as shown in FIG. 1, the direction of scan line curvature on one side of the optical axis is opposite to the direction of scan line curvature on the other side of the optical axis. Consequently the relative spacing between simultaneously scanned lines changes across the scan line in a multiple beam scanner.

Differential bow in the slow scan direction is a significant problem in multiple beam scanners. Deviations in the relative spacing between scan lines of less than 1% of the nominal line spacing may be perceived in a halftone, continuous tone, or color image. Such a stringent requirement implies a need for a position control in the slow scan direction during each line scan in order to compensate for the inherent differential bow.

Known position control schemes such as rotating mirrors and translating roof mirrors are too large to move precisely and quickly in order to compensate for deviations of the spot position during a scan. Therefore, there is presently a need in the art for spot position control apparatus and methods which provide improved continuous, fast, very high resolution deflection of an optical beam in the slow scan direction during each scan to compensate for scan line curvature in output scanners.

SUMMARY OF THE INVENTION

The present invention provides a novel method and apparatus for eliminating inherent curvature of the scan line in the slow scan direction of an optical output scanning system. In general, linearization of the scan line is provided by interposing in the image path a beam deflecting element which deflects the beam in the slow scan direction an amount which varies as the beam is scanned from initial to final position. In one embodiment, the beam deflecting element consists of a dispersive element whose output angle depends on the wavelength of the input beam. Variation of the wavelength during each scan produces deflection of the output beam controlled so as to compensate for predetermined or in situ measured curvature of the scan line. The light source in this system can be a variable wavelength solid state laser as disclosed in U.S. Pat. No. 5,208,456. In this way, scan line linearization may be achieved for either a single spot or for multiple spots by varying the wavelength of the beam of each spot according to its individual linearizing function.

The present invention may be embodied in a ROS apparatus which includes, inter alia, a variable wavelength light source, typically a multiple emitter solid state laser, for emitting multiple light beams at selected wavelengths, means for controlling the wavelength of output of each light emitter, optical beam deflecting means, such as a prism of glass or semiconductor material, for deflecting each light beam an amount determined by the beam's wavelength, means for modulating the intensity of each light beam in accordance with a data signal, means for modulating the wavelength of each light beam, means for scanning the light beams in a raster fashion, and image plane means, such as a photoreceptive element, for receiving the scanned light beams.

In operation, each light beam generated by the light source is intensity modulated in response to an image data signal. The light beam is scanned across at least a portion of a surface of the image plane means in a fast scan direction, as well as scanned across at least a portion of a surface of the image plane means in a slow scan direction which is normal to the fast scan direction. The existence and extent of deviations in the slow scan direction of the position of the light beam from a linear scan line is predetermined or measured for a part or all of the fast scan. Correction for any slow scan direction error is performed by varying the output wavelength of the light source in response to the extent of such deviation. This change in wavelength results in a change in the extent to which the light beam is deflected in the slow scan direction by the deflecting means, which ultimately changes the position that the beam strikes the image plane means, thereby linearizing the scan line. The output wavelength of the light source can be varied in response to predetermined correction information from a processor controlled memory unit or in response to a correction signal obtained from an error detecting feedback circuit.

The scope of the present invention and the manner in which it addresses the problems associated with prior art methods and apparatus will become more readily apparent from the following detailed description when taken in conjunction with the accompanying drawings and claims.

BRIEF DESCRIPTION OF THE DRAWINGS

In general, like reference numerals will be used to denote like elements as between each of the following figures, wherein.

DETAILED DESCRIPTION OF PREFERRED EMBODIMENTS

Figures 2, 3:
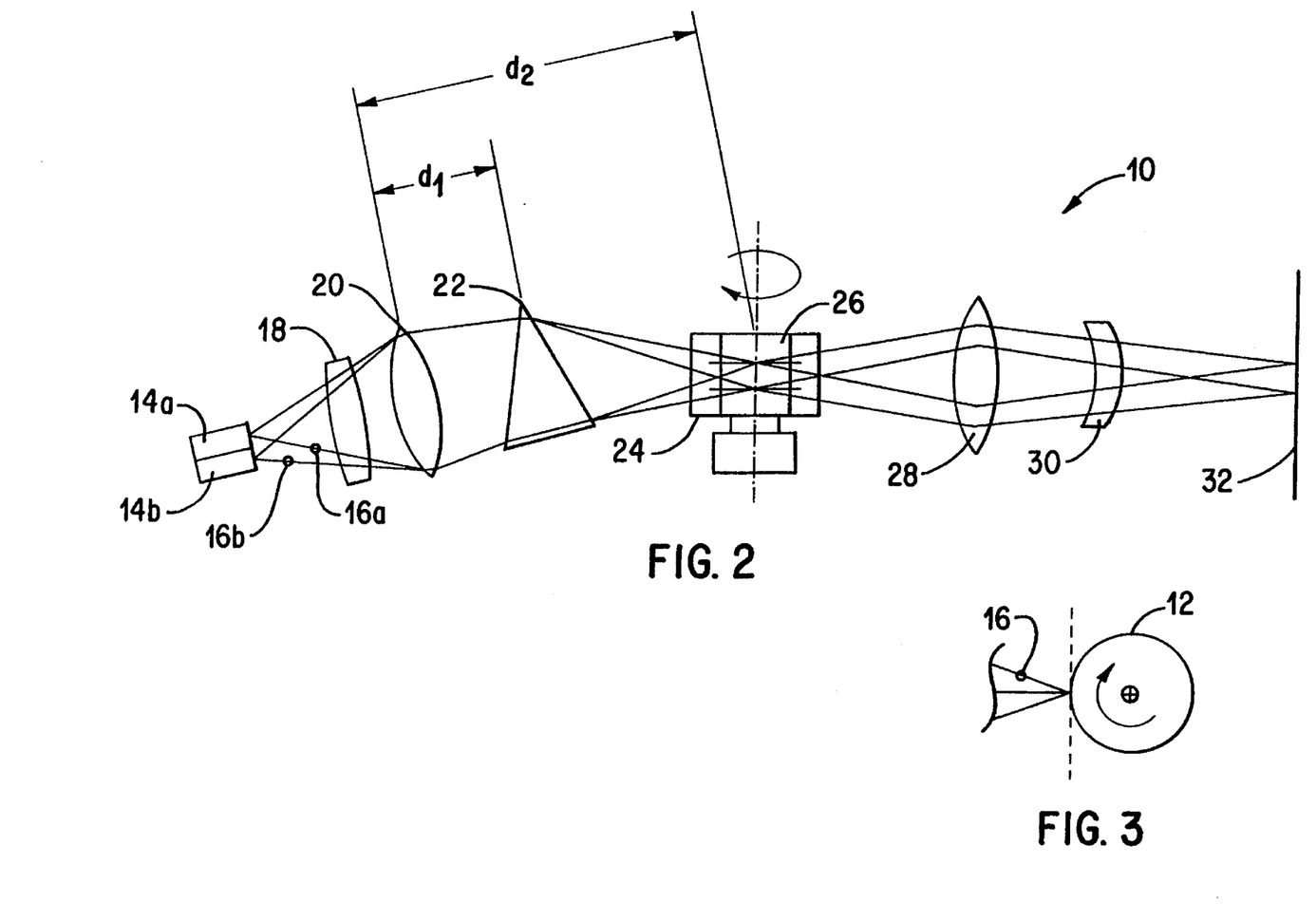
FIG. 2 shows a side or elevation view of the general optical configuration of one embodiment of the present invention, showing an optical beam deflecting element disposed between a multiple emitter light source and the rotating polygon scanning device of a typical multiple beam ROS system.
FIG. 3 shows a photoreceptive drum at the image plane of the apparatus of FIG. 1 as might typically be employed in a xerographic printing application of the present invention.
Figure 4:
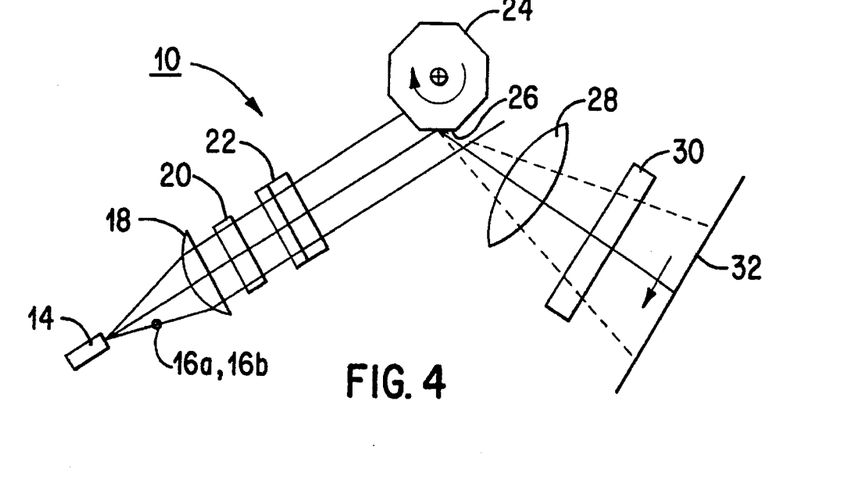
FIG. 4 shows a top or plan view of the general optical configuration of the apparatus of FIG. 1, showing an optical beam deflecting element disposed between the light source and the rotating polygon scanning device of a typical ROS system.

A first embodiment of the present invention is presented herein with reference to FIGS. 2 and 4, which show, respectively, slow scan plane and fast scan plane views of a scanning apparatus 10. Apparatus 10 is a raster output scanning device of the type which may, for example, output a scanned modulated optical signal to a photoreceptive drum 12, such as that shown in FIG. 3, for use in a xerographic printing process. Alternatively, apparatus 10 may output a scanned modulated optical signal to a display device, a photographic device or other application employing such a scanned modulated optical signal.

Apparatus 10 includes a light source 14, such as a solid state laser or array of independently controlled light generating elements such as lasers (emitters) 14a and 14b, which produce diverging beams of coherent light 16a and 16b. A multiple emitter source comprising two emitters is illustrated, but the light source can contain any number of independent emitters. In the path of beams 16a and 16b are a spherical lens 18, a cylindrical lens 20, which has power only in the slow scan plane, optical beam deflecting element 22, which is described in further detail below, scanning device 24, which is shown as a rotating polygon having at least one reflective facet 26 (but which may also be a rotating hologram, rotating diffraction grating, etc.), first spherical lens 28, and toroidal lens 30. The path of beams 16a and 16b terminate at image plane 32, which may be a line on the aforementioned rotating photoreceptive drum 12 (FIG. 3), a surface of a ground glass or other type of display screen, a photosensitive film, etc.

Spherical lens 18 serves to collimate the diverging beams 16a and 16b. Cylindrical lens 20 serves to focus beams 16a and 16b in the slow scan plane onto facet 26 of scanning device 24. Since beams 16a and 16b are not focussed in the fast scan plane, they appear on facet 26 as two lines which extend across at least a portion of the entire width of facet 26.

Prior to their incidence on facet 26, beams 16a and 16b pass through and are deflected by optical beam deflecting element 22. The role of element 22 is to provide beam deflection by an angle which is determined by the wavelength of the incident light. The structure and details of the optical beam deflecting element are discussed further below. Beams 16a and 16b, having been appropriately deflected are then reflected by facet 26 so as to pass through spherical lens 28. Since the beams converge on facet 26, upon reflection they diverge. Therefore, lenses 28 and 30 are employed to refocus the beams to circular or elliptical cross-sections onto image plane 32, and to correct for scan nonlinearity (f-theta correction). Toroidal lens 30, or an equivalent thereto (such as a cylindrical mirror) further corrects for wobble (scanner motion or facet errors).

Thus, if polygon 24 rotates in a clockwise fashion, as shown in FIG. 4, a beam reflected from one of its moving facets will be caused to scan across the image plane 32, as indicated by the arrow. By separately modulating each beam, for example by modulating the current applied to the laser itself from below to above the lasing threshold, as known in the art, multiple scanned modulated beams of general application result. If the image plane 32 comprises the line on the rotating photoreceptive drum 12 of FIG. 3, and the rotation of drum 12 and the modulation and scanning of the beams are properly coordinated, a ROS printer device may be realized. Alternatively, the image plane may be ground glass, a viewing screen, a photosensitive material (film, electrostatic receptor, etc.) or other image plane viewing or receiving medium.

Figure 5:
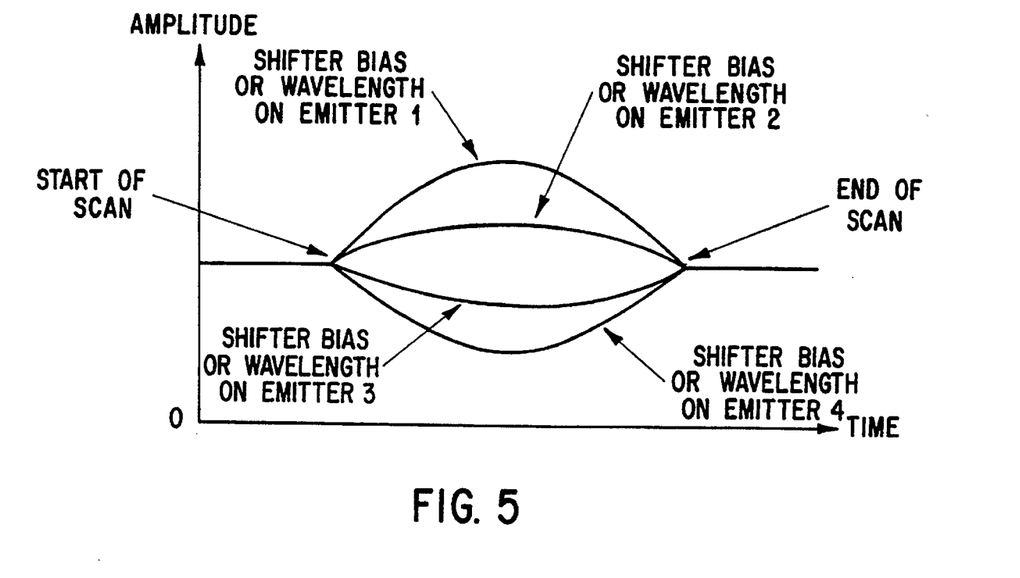
FIG. 5 illustrates the time variation of the wavelength or wavelength control signal during a single scan in which the curvature of the scan line is substantially eliminated.

Apparatus 10 is operated in the following way to substantially eliminate curvature of each scan line. At the start of each scan the output wavelengths of all lasers are set to be approximately equal. The exact starting point is set by any error signal generated to correct for misregistration from the preceding scan as described in U.S. Pat. No. 5,204,523. Thus at the start of each scan the spacing between adjacent multiple beams imaged on the photoreceptive medium is uniform and correct for the scan. As the scan proceeds, i.e. as the spot is moved across the photoreceptor in the fast scan direction, the output wavelength of each emitter is changed according to a predetermined function. The wavelength is shifted by varying the bias level on a modulator region of the laser, as described below. As a result of the wavelength shifting, the position of each spot on the photoreceptor is moved in the slow scan direction so as to form a scanned line without curvature. The polarity of the bias level variation is such that the wavelength is increased for emitters on one side of the optic axis, while the wavelength is decreased for emitters on the opposite side of the optic axis, as shown in FIG. 5. If the scan line curvature is symmetric about a midscan point of the scan line, the wavelength of each emitter is varied to a maximum or minimum value near midscan and then returned to its initial value at the end of scan. Bow of any shape or position, however, can be eliminated by properly varying the wavelength, that is, by properly shaping the bias signal. In this embodiment the wavelength is varied according to a predetermined function stored in an electronic memory. The function is established by determining the bias variation needed to linearize each scan line, by measuring the differential curvature for the light coming from each laser during final assembly of the scanner.

Figure 6:
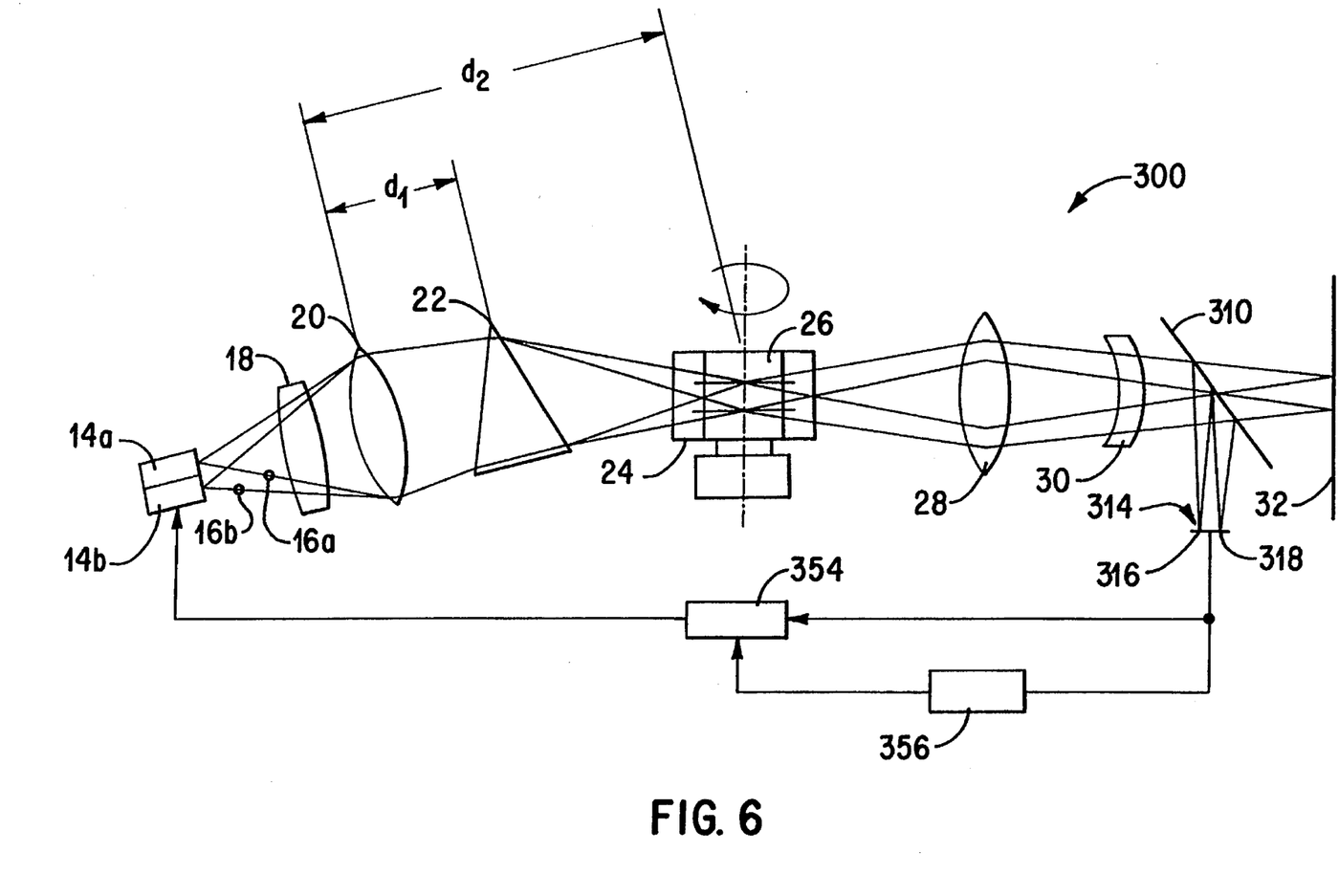
FIG. 6 shows a side or elevation view of the general optical configuration of an apparatus according to a second embodiment of the present invention, further including means for detecting the deviation of the position of the light beam in the slow scan direction on the photoreceptive drum and for feeding a measure of this deviation back to the laser light source as a control signal for adjusting the position of the laser beam emerging from the optical beam deflecting element.
Figure 7:
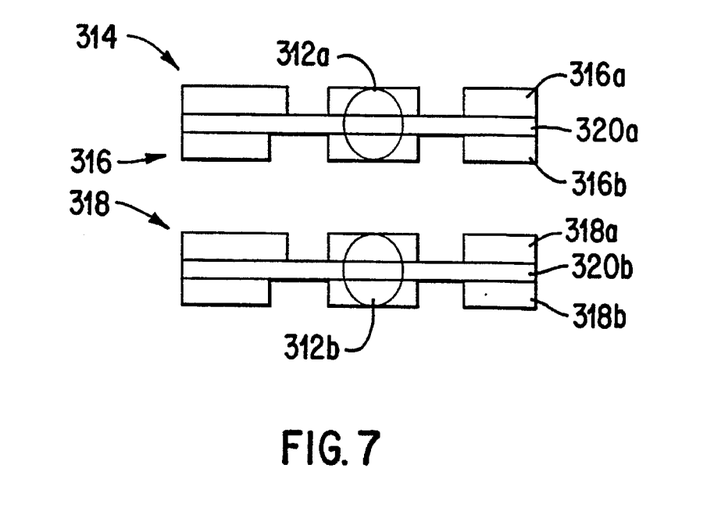
FIG. 7 shows a multiple element photodetector used in the present invention, as viewed from beam sampling element 310 in FIG. 6.
Figure 8:
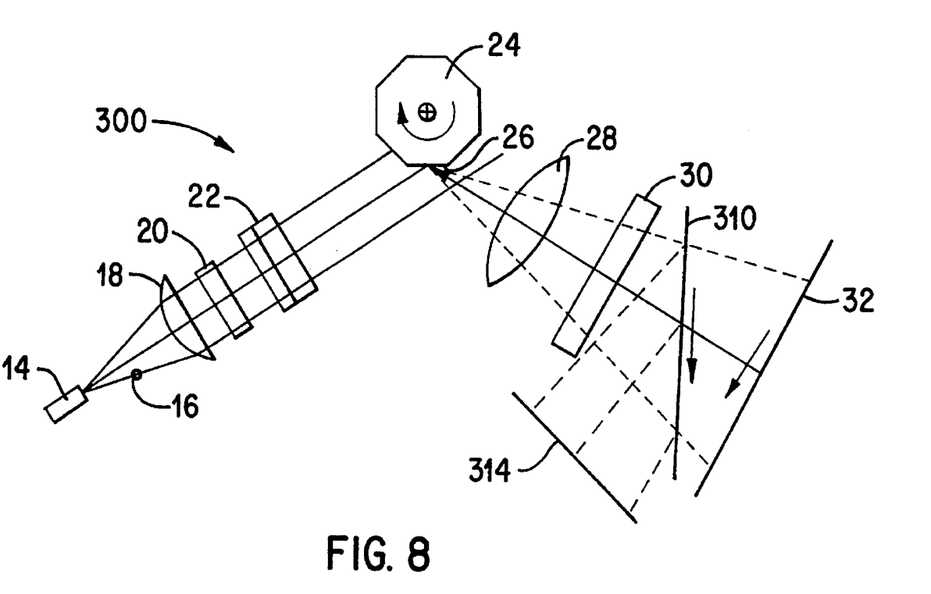
FIG. 8 shows a plan view of the apparatus of FIG. 6.

A second embodiment of the present invention is shown in FIGS. 6–8. Apparatus 300 is a raster output scanning device of the type previously described with the addition of a beam sampling element 310, and a sensor, such as a multiple element photodetector 314.

Beam sampling element 310 serves to sample the scanning beams by deflecting a small portion of each beam and forming a magnified image of the multiple scanning beams on sensor 314 positioned in a second image plane. Sensor 314 is a multiple element detector constructed and aligned such that it senses deviation of each focussed laser beam from the desired linear scan line. For example, sensor 314 can be comprised of detector arrays 316 and 318 constructed and aligned such that each one senses deviation of one focussed laser beam from the desired scan line. Each detector array comprises multiple elemental detectors constructed and aligned in pairs along a straight line as shown in FIG. 7. Each elemental detector is isolated from other elemental detectors and has a size consistent with the rapid response needed for motion sensing during a scan. Stops 320a and 320b respectively lie between elemental detectors 316a and 316b, and between elemental detectors 318a and 318b, to block the central portion of the sampled spot. Pairs of elemental detectors comprising each array 316 or 318 preferably lie in a perfectly straight line. This straight line configuration can be made by constructing the array using well known large-area amorphous silicon detector technology. Only a small number of pairs of elemental detectors are required in each array 316 or 318, because bow is a slowly varying function along the scan line. Arrays 316 and 318 may have as few as 3 pairs of elemental detectors as shown in FIG. 7, or they may have a significantly higher number. Two position sensing detectors 316, 318 are illustrated, corresponding to the two emitters illustrated. But just as the light source 14 can contain any number of independent emitters, so any number of position sensing detectors can be used, corresponding to the number of emitters. Thus, as each beam is scanned, deviations of the beam from a straight line are sensed and can be fed back to a wavelength controller of a corresponding emitter.

Photodetector 314 determines the existence and extent of deviation of sampling spots 312a, 312b from their desired, linear paths along their respective detector arrays 316, 318. Photodetector 314 generates control signals in response to these determinations, which are transmitted to a control apparatus and/or current source 354 to control the bias applied to modulator and/or amplifier regions of the respective lasers 14a, 14b of light source 14. Again, the light source 14 may comprise any number of lasers and the photodetector 314 may comprise a corresponding number of detectors generating a corresponding number of signals.

Beam deflecting element 22 can be one of several different elements which are known to provide angular deflection determined by the wavelength of the incident light. U.S. Pat. No. 5,204,523, incorporated herein by reference, shows various embodiments of deflecting element 22. For example, a diffraction grating can be used as the beam deflecting element. A diffraction grating is advantageous because it has a high dispersive power and therefore requires a relatively small wavelength shift. However a grating is disadvantaged because of the complexity and cost required in its manufacture.

A cost effective embodiment for a beam deflecting element is an optical prism. For the purposes of illustration, it will be assumed that the prism takes the form of an isosceles triangle, as shown in FIGS. 2 and 6. The optical beam deflecting element 22 is beneficially constructed from optically transparent glass for lowest cost or from a semiconductor material like AlGaAs for highest dispersive power. It will be further understood that optical beam deflecting element 22 may also be fabricated from other materials such as lithium niobate, a liquid crystal, etc.. Also, it will be appreciated that optimal results are achieved when element 22, in the case that it takes the form of a prism, is fully illuminated (i.e., fully filled with light). This is because the resolving power of the prism is inversely proportional to the width of the optical beam, which sets a lower limit on the height of the prism. Hence, fully illuminating the prism achieves maximum resolution. Although beam 16 is focused on facet 26, and not on beam deflecting element 22, by lens 20, element 22 is effectively fully illuminated by locating element 22 much closer to lens 20 than facet 26. That is, d1 is much smaller than d2 in FIGS. 2 and 6.

The basis for scan line linearization according to this invention is wavelength control of the light emitted by light source 14. A suitable light source for achieving linear scan lines is a laser source, such as a solid state, or diode laser. The output wavelength of a diode laser can be tuned over a range suitable for use with a glass prism, e.g., from 770 nm to 790 nm, by controlling loss in the laser cavity. One method for accomplishing this may be to employ a split contact laser 200 of FIG. 9, having a small but separately contacted modulator region along the axis of the laser. Such a laser 200 includes an amplifier region 202 and a modulator region 204 optically interconnected by a low-loss waveguide region 206 which together form an optical cavity. A simple method of electrically isolating amplifier region 202 and modulator region 204 is the low-loss waveguide region 206, although electrical isolation may also be achieved by appropriate diffusions and/or proton bombardment as known in the art. Bounding the optical cavity of laser 200 are facets 208 and 210, such that light from the laser emits primarily from one or the other facet. Laser 200 will be assumed to be an individual laser for the present illustration, but may be one element of a laser array, the array embodiment being described elsewhere herein.

Figure 9:
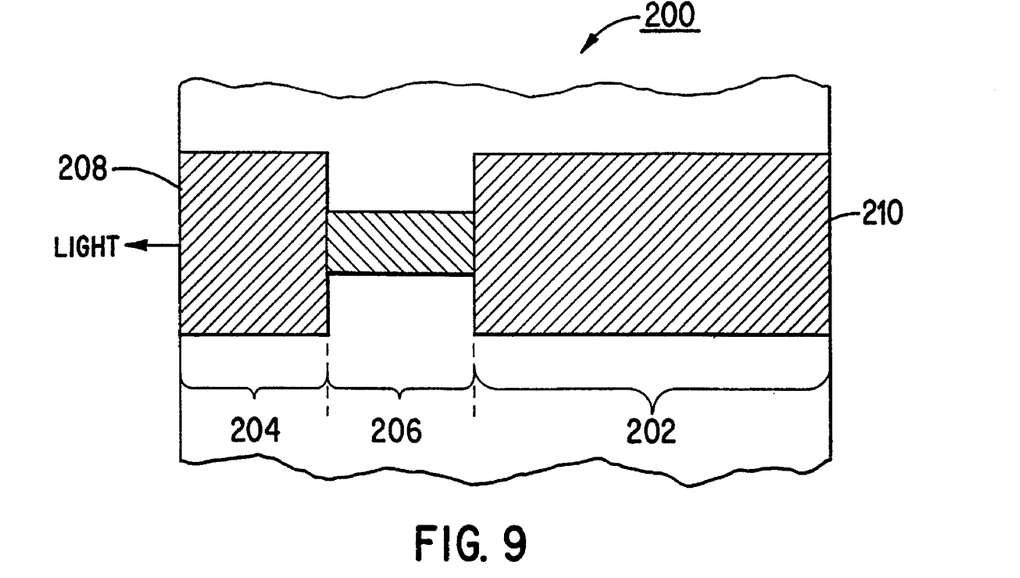
FIG. 9 shows one embodiment of a solid state laser capable of emitting at one of a number of selectable wavelengths.

Variation of the bias level on modulator region 204 controls the amount of loss present in the laser cavity from a maximum value $L_{max}$ to a minimum value $L_{min}$. Maximum loss is obtained with modulator region 204 unbiased (or reverse biased) and results from the intrinsic absorption of the unpumped active layer (not shown). Minimum loss is obtained with modulator region 204 forward biased, although the loss may also be negative, i.e., the modulator region 204 providing gain. With the modulator region 204 set for minimum loss, laser 200 is designed to emit at the longest wavelength required. As the modulator current is decreased, loss in the modulator region 204 is increased and the wavelength shortens. The length of modulator region 204 is determined by the amount of wavelength shift required. Although tuning is discontinuous as the wavelength hops from one longitudinal mode to the next, the wavelength changes can be made to be less than 0.1 nm by using a laser with cavity longer than about 750 µm. As a result, the small but discrete wavelength shifts are used in a digital fashion to approximate a continuous wavelength variation. In addition, the threshold of laser 200 is increased as the wavelength is shortened so that current to amplifier region 202 is increased in order to maintain constant power output at the lasing wavelengths. Thus, wavelength tuning at constant power is accomplished by simultaneously switching drive currents to both the amplifier region 202 and the modulator region 204.

Alternatively, a wavelength tunable diode laser such as described by Y. Yoshikuni, *Electron. Lett.* 22('86), 1153 can be used. In this case, the laser cavity is divided into three sections. The first section provides optical gain, the second section provides index tuning of the laser cavity, and the third section provides wavelength selectivity from a grating reflector.

Figure 10:
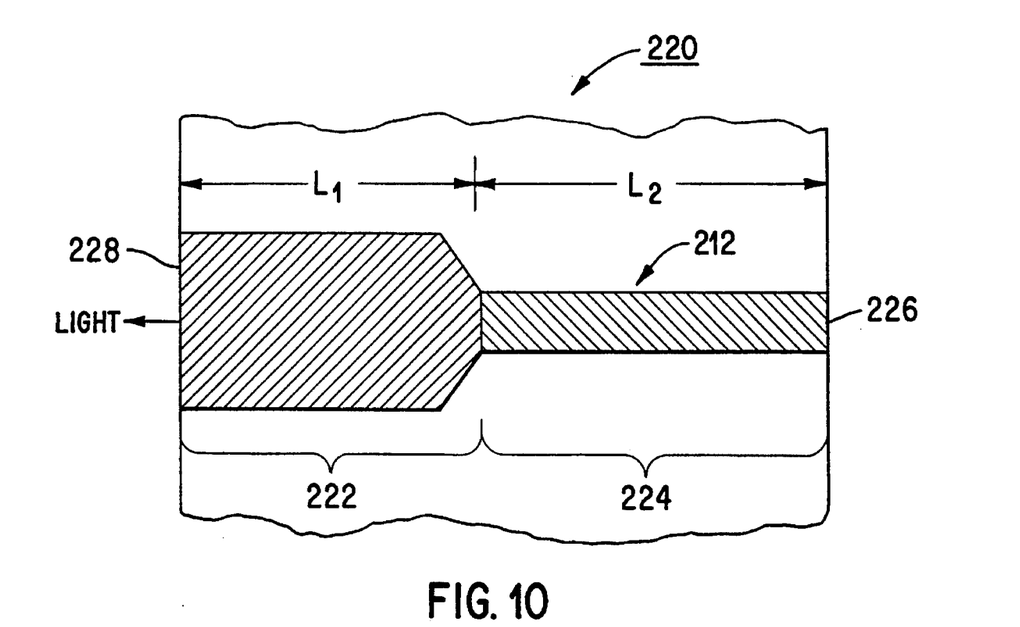
FIG. 10 shows an embodiment of a solid state laser capable of emitting a continuously tunable wavelength.

The output wavelength of a diode laser can also be tuned over a range suitable for use with a semiconductor prism, e.g., from 780 nm to 781 nm, by controlling the index of refraction in the laser cavity. This approach inherently produces a smaller tuning range than the loss modulator described above, but is advantageous in that tuning is continuous (as opposed to step-wise) and variations in the power output between the different wavelengths are reduced. A laser 220 capable of achieving index control is shown in FIG. 10, and includes an amplifier region 222 and a separately contacted high bandgap modulator region 224 along the axis of the laser between rear facet 226 and light emitting facet 228 (although emission may be at either one of the two facets 226 or 228). In index modulator region 224, the optical waveguide has a bandgap greater than the bandgap of the amplifier region 222, and so does not absorb the lasing emission. Such a low-loss region can be produced by layer disordering techniques or by laser patterned desorption as known in the art (for example, see U.S. Pat. No. 4,962,057, issued Oct. 9, 1990, to Epler et al.) The index of refraction of the optical waveguide under forward bias is a function of the injected carrier density pursuant to the free carrier injection effect. For a detailed discussion of the free carrier injection effect see U.S. Pat. No. 5,212,381. For an integrated device of this kind, we find that the index change $\Delta n$ required to shift the wavelength is given by $$\Delta n = [n_{g1} L_1/L_2 + n_{g2}] \Delta \lambda / \lambda \quad (7)$$

where $L_1$ and $L_2$ are the lengths of the amplifier and modulator regions, respectively, and $n_{gi} = n_i - \lambda dn_i/d\lambda$ is known as the group refractive index in the amplifier region (i=1) or the modulator region (i=2) and $\lambda$ is the mean wavelength of operation. For AlGaAs, laser measurements give $n_{g1} = 4.24$ at 780 nm. From the experimental data of Casey et al., Applied Physics Letters vol. 24, no. 63 (1974), we calculate $n_{g2}=1.83$ for $Al_{0.2}Ga_{0.8}As$ at 780 nm. For $\Delta\lambda=1$ nm, $L_1=250$ µm and $L_2=1000$ µm, $$\Delta n_2 = [4.24 \times (250/1000) + 1.83] \times [1.28 \times 10^{-3}] = 3.7 \times 10^{-3}$$

From Casey and Parish, *Heterostructure Lasers Part A: Fundamental Principles*, p. 31 (Academic Press 1978), the index change at 780 nm from the free carrier plasma is $\Delta n = -1.123 \times 10^{-21} / cm^3 \times \Delta N$, where $\Delta N$ is the change in carrier density. Thus, a carrier density change of $|\Delta N| = 3.29 \times 10^{18}/cm^3$ will produce a $\Delta n_2$ sufficient to shift the wavelength by 1 nm. Since the index change is negative, the wavelength is shortened. (In actuality, the operating wavelength is also shortened as a result of the increased threshold current produced by the small amount of optical absorption introduced by the injected carriers. Since both effects shorten the operating wavelength, a lower carrier density than calculated above will actually be required.)

If a wavelength shift much less than 1 nm may be employed, the modulator region 224 of FIG. 10 may be reversed biased in order to vary the refractive index via the electro-optic effect. This approach is advantageous in that the power output of laser 220 will remain nearly constant between wavelengths without need to adjust the current to the amplifier region 222. See the aforementioned U.S. Pat. No. 5,212,381 for a more detailed discussion of the electro-optic effect.

The method of the present invention may utilize either feedback control or control from stored data, or both, to move the spot in the process scan direction to accommodate for scan line bow and the like. In the case of feedback control, deviation of the spot from a desired scan line is determined by sensing apparatus such as multiple element photodetector 314. From that deviation are generated the proper control signals for effecting the wavelength adjustment resulting in the desired spot positioning. In the case of control from stored data, the spot position correction is predetermined. This method is feasible for certain recurrent errors such as distortion due to fixed optical elements. The predetermined correction is applied to the apparatus controlling the bias applied to the light source from a processor controlled memory device 356 or the like, shown in FIG. 6. The output of the processor controlled memory device 356 is synchronized by the sensing apparatus, or other suitable synchronization arrangement, and may or may not be used in conjunction with a real-time error determining package such as that described immediately above.

The stored data reflecting predetermined spot position correction is generated in an initializing step, e.g. a step in manufacturing the device. Scan lines are generated, and the existence and extent of scan line curvature, that is, the deviation of the spot from a desired linear path, is determined. Based on this determination, data is stored in memory, such as memory 356, from which a signal may later be generated to correct scan line curvature during operation of the device. This predetermined spot position correction stored in memory may thus be applied at a later time to correct scan line curvature.

Figure 11:
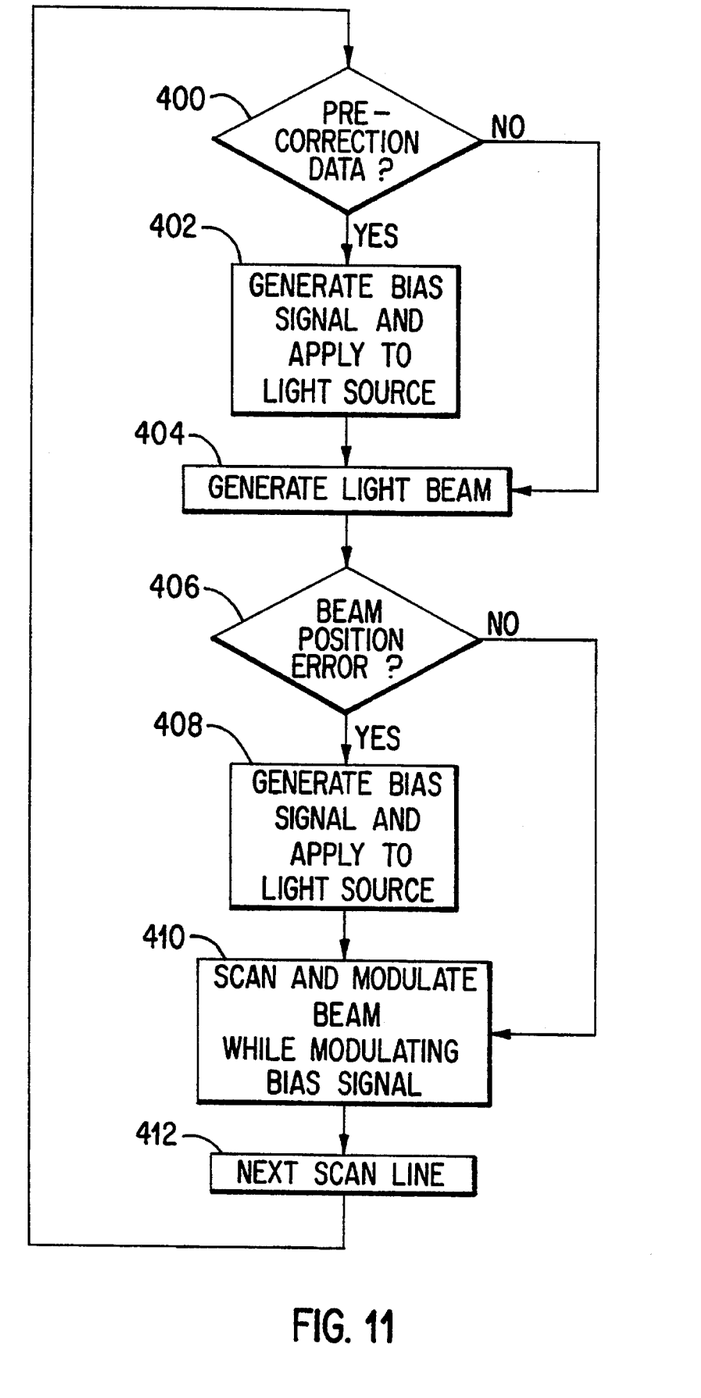
FIG. 11 is a flow diagram of one embodiment of the present invention for compensating for predetermined deviations in the linearity of the scan line during a scan.

FIG. 11 details one complete cycle of operation of the method of the present invention for correcting curvature of the scan line. It will be assumed that any predetermination of required correction for recurrent errors has been made, and that the correction data has been stored in an appropriate memory device (not shown). To begin, means (not shown) are employed to determine whether the current scan line is one for which predetermined correction data has been stored. This is shown at step 400. If such data exists, the data is converted into a bias signal which is applied to the modulator region of the laser or other means for controlling the laser's output wavelength in order to correct for initial predetermined spot position error, as shown at 402. Once the correction for predetermined errors has been made, or if no such predetermined error data exists, the light beam is generated at 404. Next, the position that the beam is incident on the image plane is determined at 406 (alternatively, error in photoreceptor motion or position correctable by selective spot positioning is determined). If there is slow scan direction position error at this point, the extent of that error is determined by appropriate determining apparatus, for example by as described in U.S. Pat. No. 5,208,456. The extent of that error is converted to an appropriate electrical bias signal which is communicated to the modulator region of the laser or other means for controlling the laser's output wavelength at 408 in order to correct for the determined error before the start of the scan. Once the correction for this error has been made, or if it is determined that no such error exists, the beam may then be scanned and modulated in order to write the scan line at 410. Synchronized with the start of the scan, bow correction data is extracted from memory and converted into a bias signal which is applied to the modulator region of the laser or other means for controlling the laser's output wavelength in order to linearize the scan line. Typical variations of wavelengths or control signals applied during the scan are illustrated in FIG. 4. When the end of scan is detected, a call is made for the next scan line data at 412, the scan processes in the slow scan direction and the process begins again at 400.

By incorporating the above described spot position control methodology with the appropriate apparatus for xerographic printing, including, for example, a photoreceptor belt or drum, means for moving the photoreceptor, means for charging the photoreceptor, means for forming a latent image on the photoreceptor, means for transferring the latent image to paper, means for erasing the latent image from the photoreceptor and for cleaning the photoreceptor, paper transport means, and means for fusing the image onto the paper, a complete xerographic print engine may be produced. Details of the structure and operation of printer devices in general are beyond the scope of the present disclosure, however they are well known to those skilled in the art. It will be appreciated from the above description, though, that the present invention is particularly well suited for inclusion in those printing applications employing ROS as a portion of the printing process, as well as other printing applications.

In general, to those skilled in the art to which this invention relates, many changes in construction and widely differing embodiments and applications of the present invention will suggest themselves without departing from its spirit and scope. For example, the present invention operate equally well, and without significant modification, to control spot position in a single beam ROS, where the laser emitter is displaced from the optic axis as part of ROS assembly. Furthermore, it is possible to fold the optics of a ROS apparatus incorporating the present invention, and thereby compact the apparatus, by employing a reflective or transmissive/reflective body, as opposed to the aforementioned purely transmissive body, as the dispersive element. Further still, the present disclosure has detailed several methods of shifting the wavelength of the light source in order to control spot position, but it will be appreciated that other methods and apparatus for wavelength control may be employed without departing from the spirit and scope of the present invention. Thus, the disclosures and descriptions herein are illustrative, and are not intended to be in any sense limiting.

What is claimed is:

1. A method of correcting scan line curvature in an optical output system in which at least one beam of light is focussed to a spot in a scan line upon an image plane, comprising the steps of:

generating at least one beam of light by a light generating element offset from an optical axis of the optical output system;

deflecting the at least one beam of light by an optical beam deflecting element that deflects the at least one beam of light by an amount that is determined by the wavelength of the at least one beam of light;

scanning the spot across the image plane to form a scan line, the offset of the light generating element from the optical axis tending to create curvature of the scan line; and correcting scan line curvature by varying the wavelength of at least a designated one of the at least one beams of light such that the amount that the at least one designated beam of light is deflected by the optical beam deflecting element is varied to achieve control of the position of the spot at which the at least one beam of light is incident on the image plane.

2. The method of claim 1, wherein the light generating element comprises a laser and the varying step includes varying at least the electrical current applied to a control region of the laser.

3. The method of claim 1, wherein the scanning step comprises the step of reflecting the at least one beam of light by a scanning element distinct from the deflecting element.

4. The method of claim 1, wherein the correcting step comprises the steps of:

sampling the at least one beam of light to create at least one sampling spot upon a second image plane;

detecting deviation of the at least one sampling spot from a desired path;

generating a signal based on the detected deviation; and applying the signal to the light generating element;

wherein the correcting step occurs in accordance with the applied signal.

5. The method of claim 4, wherein the desired path is linear.

6. The method of claim 4, wherein the light generating element comprises a laser and the varying step includes varying at least the electrical current applied to a control region of the laser.

7. The method of claim 1 wherein the generating step includes generating a plurality of beams of light by respective light generating elements offset from the optical axis.

8. The method of claim 7, wherein the correcting step comprises the steps of:
sampling the plurality of beams of light to create a plurality of sampling spots upon the second image plane;
detecting deviation of the sampling spots from respective desired paths;
generating a signal based on each detected deviation; and
applying the signals to the respective light generating elements;
wherein the correcting step occurs based on the applied signals.

9. In an optical output system wherein a beam of light is generated and focused to a spot in a scan line on an image plane, a method of positioning the spot so as to correct scan line curvature, comprising the steps of:
generating a beam of light by a light generating element offset from an optical axis of the optical output system;
deflecting the beam of light by an optical beam deflecting element that deflects the beam of light by an amount that is determined by the wavelength of the light beam;
scanning the spot across the image plane to form a scan line, the offset of the light generating element from the optical axis tending to create curvature of the scan line;
determining the existence and extent of deviation of the spot from a desired linear scan line;
generating a signal which is proportional to the determined existence and extent of deviation; and
varying the wavelength of the beam of light by an amount which is determined, at least in part, by the signal, such that the amount that the beam of light is deflected by the optical beam deflecting element is varied to achieve correction of scan line curvature.

10. The method of claim 9, wherein the light generating element comprises a laser, and the wavelength of the beam of light is varied by varying at least the electrical current applied to a control region of the laser.

11. The method of claim 9, wherein the scanning step comprises the step of reflecting the at least one beam of light by a scanning element distinct from the deflecting element.

12. The method of claim 9, wherein the generating step includes generating a plurality of beams of light by respective light generating elements offset from the optical axis, the plurality of beams each being focussed to a spot.

13. The method of claim 12, wherein:
the determining step includes determining deviation of the plurality of spots from desired linear scan lines;
the generating step includes generating a signal based on each determined deviation; and
the varying step occurs based on the signals, the signals each being applied to a respective light generating element.

14. In an optical output system wherein a beam of light is generated and focused to a spot on an image plane, and further wherein the spot is scanned across the image plane to form a scan line, a method of positioning the spot on the image plane so as to compensate for scan line curvature, caused by offset of a light generating element that generates the beam of light from an optical axis of the optical output system, comprising the steps of:
determining the existence and extent of scan line curvature;
storing data in a memory from which a signal may be generated to correct for the scan line curvature; and,
for each scan line,
determining whether spot position must be corrected based on the stored data;
generating a beam of light at a first wavelength if spot position need not be corrected, and generating a beam of light at a second wavelength if spot position must be corrected; and
correcting scan line curvature by deflecting the generated beam of light by an optical beam deflecting element that deflects the beam of light by an amount that is determined by the wavelength of the light beam, the deflecting element deflecting the light beam at the second wavelength by an amount sufficient to correct scan line curvature.

15. The method of claim 14, wherein the beam of light at both the first and second wavelengths is generated by a laser, and wherein the method further comprises the step of varying at least the electrical current applied to a control region of the laser so as to select between the first and second wavelengths.

16. In an optical output device wherein at least one beam of light is generated and focused to a spot in a scan line upon an image plane, an apparatus that corrects scan line curvature by controlling the position of the spot in the image plane, comprising:
at least one light generating element, offset from an optical axis of the optical output device and capable of emitting the at least one beam of light at a selected one of at least two selectable wavelengths;
a scanning element that reflects the at least one beam of light to create the scan line, wherein the offset of the at least one light generating element from the optical axis tends to create curvature of the scan line; and
a beam deflecting element that corrects scan line curvature by deflecting the at least one beam of light by an amount that depends on the wavelength of the at least one beam of light, the amount of deflection determining the position of the spot in the image plane.

17. The apparatus of claim 16, wherein the at least one light generating element is a variable wavelength laser, the wavelength being varied by varying at least the electrical current applied to a control region of the laser.

18. The apparatus of claim 16, wherein the scanning element comprises a rotatable, multi-faceted polygon.

19. The apparatus of claim 16, further comprising:
a beam sampling element that deflects a portion of the at least one beam of light to form a sampling spot; and
a sensor that detects deviation of the sampling spot from a desired linear path and generates at least one signal applied to the at least one light generating element, the wavelength of the at least one beam of light emitted by the at least one light generating element being dependent on the signal.

20. The apparatus of claim 16, further comprising a plurality of light generating elements each offset from the optical axis of the optical output device and each being capable of emitting a beam of light at a selected one of at least two selectable wavelengths.

21. The apparatus of claim 20, further comprising:
a beam sampling element that deflects a portion of the plurality of beams of light to form a plurality of sampling spots; and a plurality of detectors that detect deviation of the sampling spots from a desired linear path and that generate signals applied to the plurality of light generating elements, the wavelengths of the plurality of beams of light being dependent on the signals.

22. The apparatus of claim 16, wherein the beam deflecting element is a prism.

23. A system for outputting an optical signal, comprising:

a light generating element positioned off an optical axis of the system and capable of emitting a beam of light at a selected one of at least two selectable wavelengths;

beam deflecting means located in the path of said beam of light for deflecting the beam of light an amount which depends on the wavelength of the beam of light;

image plane means for receiving the light beam;

means for focusing the light beam to a spot on the image plane means; and means for scanning the light beam in a raster fashion in a fast scan plane to form a scan line, wherein said beam deflecting means is oriented such that a shifting of the light beam from one to another of the at least two selectable wavelengths causes the beam deflecting means to change the amount that the beam is deflected and thereby reposition the spot on the image plane means in a slow scan direction which is orthogonal to the fast scan direction, and wherein the positioning of the light generating element off the optical axis tends to create curvature of the scan line;

whereby shifting of the light beam from one to another of the at least two selectable wavelengths causes the beam deflecting means to change the amount that the beam is deflected and thereby reposition the spot on the image plane means to tend to linearize the scan line.

24. The system of claim 23, wherein the light generating element comprises a variable wavelength laser, and further wherein the system includes means for selecting one of at least two selectable wavelengths of the output of the laser.

25. The system of claim 24, further including means for determining the existence and extent of deviation in the position of the spot in the slow scan plane from a linear path, and means for applying such determination to the selecting means, such that a shift of the light beam from one to another of the at least two selectable wavelengths is caused to tend to linearize the scan line, and such that such a shift in wavelength causes the beam deflecting means to change the amount that the beam is deflected and thereby reposition the spot on the image plane means in the slow scan direction to compensate for the determined existence and extent of deviation from the linear path.

26. The system of claim 24, further including means for determining needed application of predetermined spot position correction, and means for applying such determination to the selecting means, such that a shift of the light beam from one to another of the at least two selectable wavelengths is caused, and such that such a shift in wavelength causes the beam deflecting means to change the amount that the beam is deflected and thereby reposition the spot on the image plane means in the slow scan direction in accordance with the predetermined correction to tend to linearize the scan line.

27. The system of claim 25, further including means for determining needed application of predetermined spot position correction, and means for applying such determination to the selecting means to tend to linearize the scan line.

28. A system for outputting an optical signal, comprising:

a variable wavelength laser light generating element spaced from an optical axis of the system and capable of emitting a beam of laser light at a selected one of at least two selectable wavelengths;

means for selecting the one of at least two selectable wavelengths of the output of the laser light generating element;

rotating output scanning means located in the path of said light beam for scanning the light beam in a raster fashion in a fast scan plane to form a scan line, the spacing of the laser light generating element from the optical axis tending to create scan line curvature;

a beam deflecting element located in the path of said light beam, whose index of refraction varies as a function of the wavelength of light passing therethrough, for deflecting the beam of light in a slow scan plane, which is orthogonal to the fast scan plane, an amount which depends on the wavelength of the beam of light;

image plane means for receiving the light beam;

means for focusing the light beam to a spot on the image plane means;

means for determining deviation in the position of the spot on the image plane means from a desired linear scan line;

means for determining needed application of predetermined spot position correction; and means for applying the determination of deviation and the determination of needed application of predetermined spot position correction to the selecting means, such that a shift of the light beam from one to another of the at least two selectable wavelengths is caused, and such that such a shift in wavelength causes the beam deflecting element to change the amount that the beam is deflected and thereby reposition the spot on the image plane means in the slow scan direction to compensate for the determined deviation and the determined needed application of predetermined spot position correction, to correct scan line curvature.

* * * * *